2 Sheets—Sheet 1.
C. V. LITTLEPAGE.
SAW TOOTH.
No. 105,345. Patented July 12, 1870.
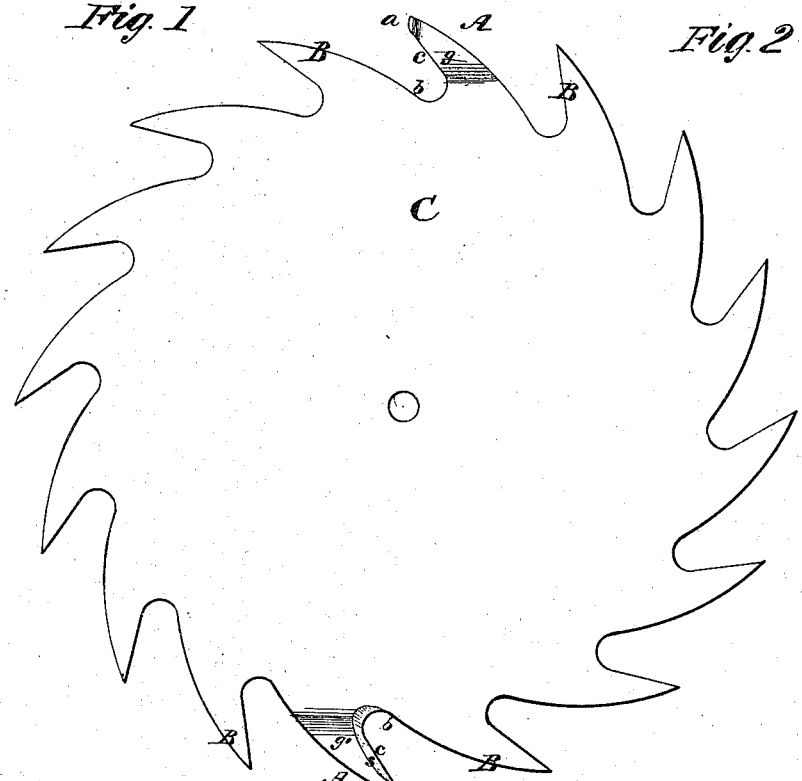
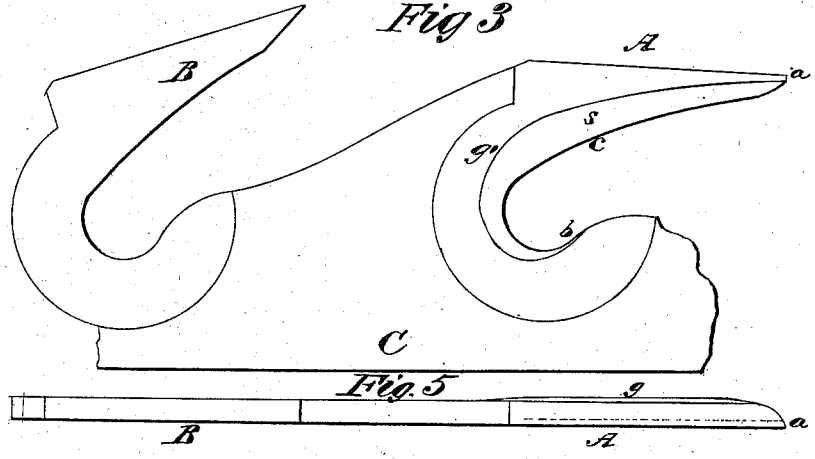
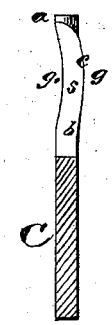
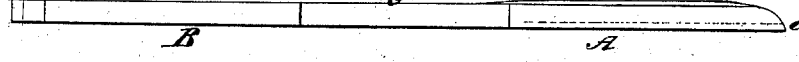
Witnesses.
R. S. Campbell
J. N. Campbell
Inventor
C. V. Littlepage
by
Mann, Finwick & Lawrence 2 Sheets—Sheet 2.
C. V. LITTLEPAGE.
SAW TOOTH.
No. 105,345. Patented July 12, 1870.
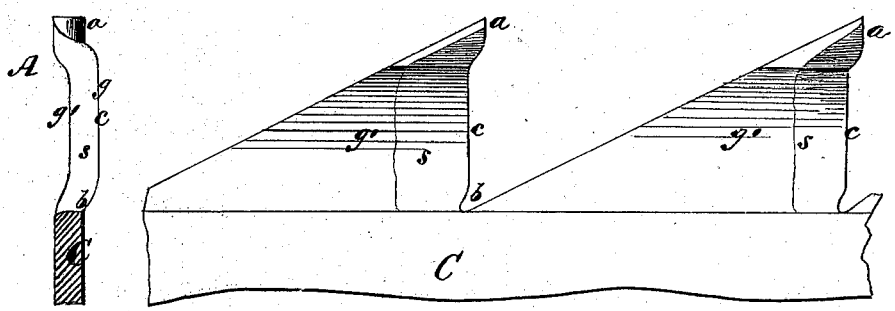
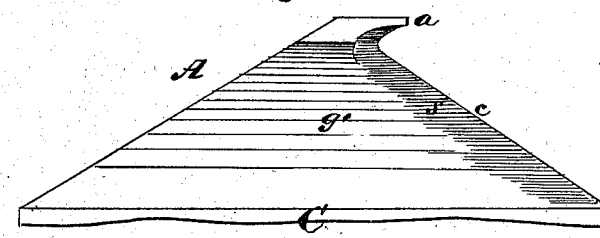 
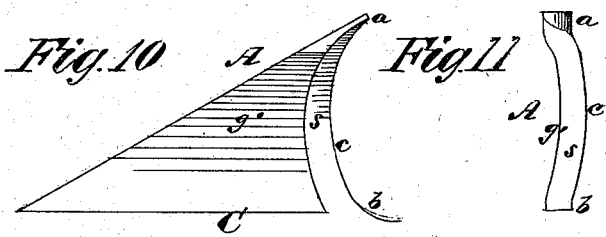 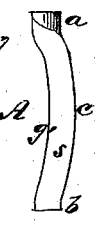
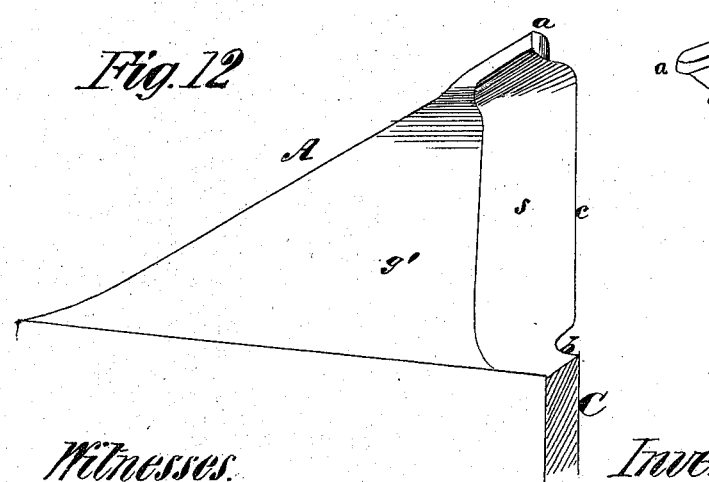 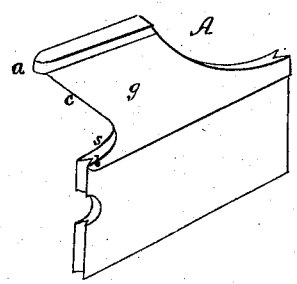
Witnesses
R. T. Campbell
J. N. Campbell
Inventor
C. V. Littlepage
by
Mason, Fenwick & Lawrence

United States Patent Office.

CALEB V. LITTLEPAGE, OF AUSTIN, TEXAS.

Letters Patent No. 105,345, dated July 12, 1870.

IMPROVEMENT IN SAW-TEETH.

The Schedule referred to in these Letters Patent and making part of the same

*To all whom it may concern:*

Be it known that I, CALEB V. LITTLEPAGE, of Austin, in the county of Travis and State of Texas, have invented an Improvement in Saw-Teeth; and I do hereby declare that the following is a full, clear, and exact description thereof, reference being had to the accompanying drawing making part of this specification, in which—

Figure 1, plate 1, shows a circular saw, having two of my improved teeth applied to it.

Figure 2, plate 1, is an edge view of the circular saw.

Figures 3, 4, and 5, plate 1, letter A shows the invention applied to a tooth, such as B. In this illustration, the tooth is of that kind which is inserted in the blade instead of being formed on it.

Figures 6, 7, 8, 9, 10, 11, and 12, are views of different forms of teeth for straight and circular saws, having my invention applied to them.

Similar letters of reference indicate corresponding parts in the several figures.

My present invention consists in a rounded or beveled point formed on the saw, which is sharpened and shaped to plane and dress the sides of the wood on each side of the kerf, during the act of sawing the wood, as will be hereinafter described.

To enable others skilled in the art to understand my invention, I will explain its construction and operation.

In the accompanying drawing—

Figs. 1 and 2, A A, represent two planers, which are formed on the blade C, diametrically opposite each other.

In fig. 3, the planers A are made separate from their blade C, and afterward secured therein by grooves and rivets. Each planer presents a forward-cutting or planing-edge, c, extending from the inner margin of the guard a to the root b of the tooth.

This edge is formed by beveling the tooth, as shown at s, and curving the beveled portion so that the cutting-edge is brought outside of the plane of the saw-blade to a sufficient extent for taking off a shaving. The curve commences at the root of each planer, and terminates, as above intimated, at the inner marginal line of the extension-guard a. A planing-tooth is thus formed, which, on one side, $g_1$ is convex, and on the other side, $g'$, is concave.

The outer end of each planer terminates within the plane of the saw-blade, as shown in figs. 4 and 5.

A tooth constructed as above described, with the exception of the extension guard a, was secured to me by Letters Patent numbered 102,286, and dated on the 26th day of April, A. D. 1870.

My improvement on said patented tooth, and other planing-teeth of a similar character lies in the beveled or rounded side or sides at its forward end, as shown on plates 1 and 2 of the drawing, so that such end or point cannot engage with the sides of the kerf in sawing and planing stuff, and hence will not spring out of line and abrade or mar the surface of the wood, or hang in the same in such a manner as to be broken during the sawing and planing operation.

When a single rounded side or bevel at the forward end of the guard is adopted, it is formed on the convex side of each tooth, so that, whatever may be the tendency to deviation of this end of the tooth from the plane of the saw-blade, caused by strain on the cutting-edge c, all such tendency will be counteracted by the guard, inasmuch as this guard or blank portion of the tooth cannot engage with the fibers of the stuff.

By thus making a saw-tooth with planing edge, and with a beveled or rounded point-guard, I relieve it from a large amount of friction, and overcome dangers of breakage from strain, during the operation of sawing.

While my invention is especially applicable to the planers shown in figs. 1 and 2, and fully described in my Letters Patent before named, I do not confine myself to this particular form of planer, as the invention is equally applicable and advantageous when applied to other forms of planing-teeth, as will be evident from inspection of the other views of the drawings.

Figure 13 represents a slightly modified form of tooth.

In this plan the forward point of the tooth is beveled or rounded on both sides, instead of only on one side. This right and left bevel will prevent the tooth, under all circumstances, from running diagonally or crosswise into the wood in either direction.

I am aware that an extension guard for a planing-saw tooth is not new, and therefore I make no claim to the same; but What I do claim as my invention, and desire to secure by Letters Patent, is—

The planing-tooth for saws, provided with the beveled or rounded side or sides at the forward end a of the extension guard, substantially as and for the purpose described.

C. V. LITTLEPAGE.

Witnesses:
EDM. F. BROWN,
J. V. CAMPBELL.